United States Patent [19]
Lieber

[11] 4,060,160
[45] Nov. 29, 1977

[54] SAFETY GUARD FOR POWER OPERATED MACHINE

[76] Inventor: Raymond Stanley Lieber, P.O. Box 813, Holloman AFB, N. Mex. 88330

[21] Appl. No.: 632,627

[22] Filed: Nov. 17, 1975

[51] Int. Cl.² .................. F16D 71/00; H01H 3/16
[52] U.S. Cl. ........................... 192/134; 100/53; 192/130; 200/61.42; 200/61.58 R
[58] Field of Search ............. 192/129 A, 130, 133, 192/134; 200/61.42, 61.43, 61.41, 61.58; 100/53

[56] References Cited

U.S. PATENT DOCUMENTS

| | | | |
|---|---|---|---|
| 1,684,296 | 9/1928 | Brodsky | 192/130 X |
| 2,315,151 | 3/1943 | Booth | 192/134 |
| 2,400,486 | 5/1946 | Carlyle | 192/134 |
| 3,333,355 | 8/1967 | Tucker | 192/133 X |
| 3,487,182 | 12/1969 | Grundy | 192/134 X |

FOREIGN PATENT DOCUMENTS

| | | | |
|---|---|---|---|
| 635,756 | 1/1928 | France | 192/133 |
| 852,204 | 10/1952 | Germany | 192/130 |

Primary Examiner—Allan D. Herrmann

[57] ABSTRACT

A safety gate, made of electrically conducting and non-conducting materials, is mounted to the ram, or similar instrument, of a power operated machine and is made to be free floating in at least one direction. The means of powering the machine may be electrical, mechanical, hydraulic, or pneumatic; however, there must be an electrical source available. The gate contains a means of sensing the presence of the workpiece and foreign objects which is powered by the electrical source; this means is connected to the machine in such a manner that the machine will be caused to stop or reverse if a foreign object, such as a human extremity, is sensed. A stationary guard shields those danger areas on the machine not protected by the safety gate.

16 Claims, 16 Drawing Figures

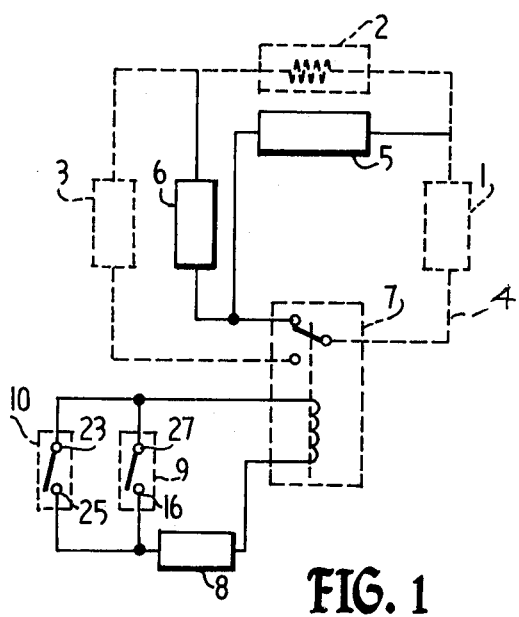
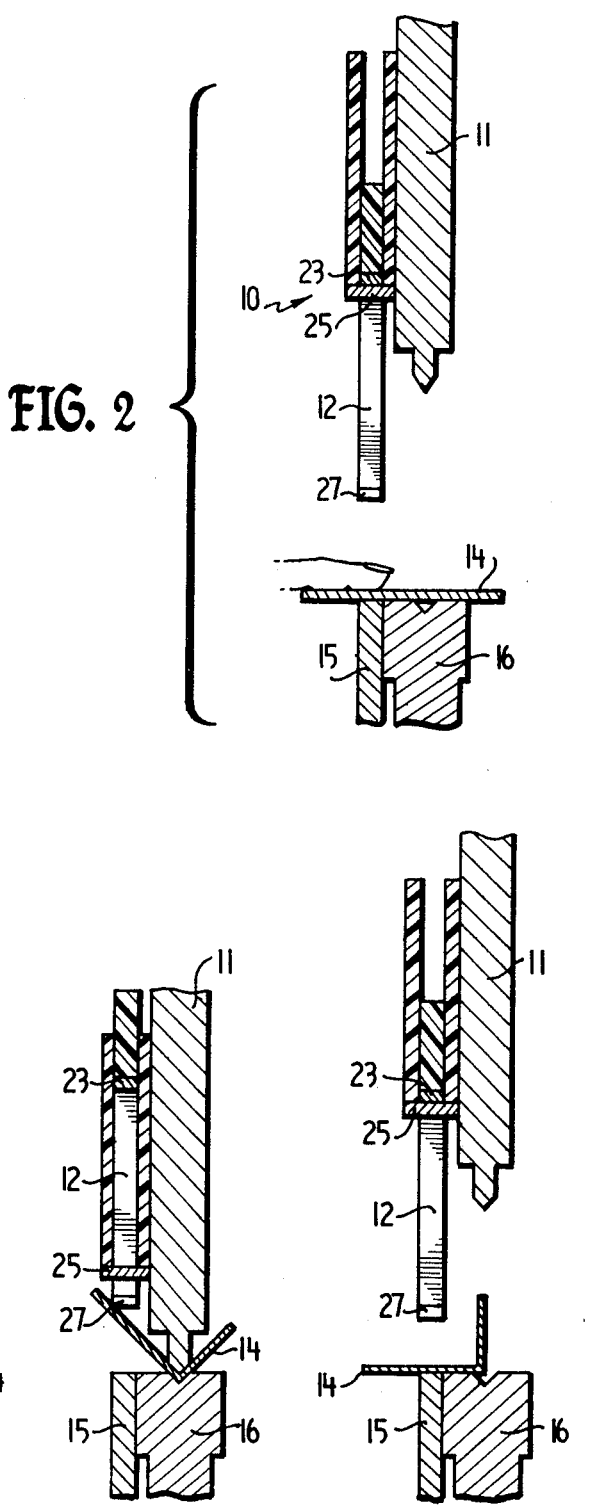
FIG. 1 FIG. 2 FIG. 3 FIG. 4 FIG. 5 FIG. 6

SAFETY GUARD FOR POWER OPERATED MACHINE

This invention relates to safety devices for power operated machines utilizing a ram or similar instrument, especially those machines that are concerned with the working of metals; it is particularly directed to those machines that either are capable of stopping or reversing operations, or can be made capable of stopping operations through modifications.

The main object of the invention is the protection of personnel in the proximity of the machine without adverse effect upon either the efficiency or the effectiveness of either the worker or the machine. Other objects will become obvious from the following description taken together with the drawings wherein:

FIG. 1 is a schematic illustration of the control circuitry used in the present invention;

FIG. 2-6 progressively illustrate the operation of the invention used with a ram;

Figure 7:
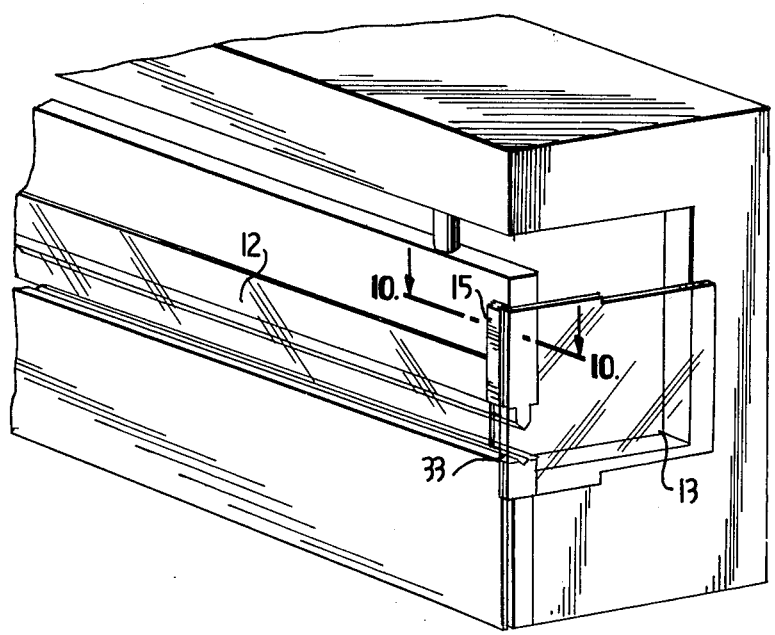
FIG. 7 is a schematic perspective of one means for mounting the safety gates of the present invention.

Various methods have been devised in the past to prevent an operator from moving a part of parts of his body into the danger area of a power operated machine utilizing a ram or a similar instrument. These methods relay upon the cooperation of the operator of the machine; if the guard caused the operator excessive problems, or slowed his production rate, he would, in many cases, find a way to defeat the guard or would remove it from the machine. Each of the six major types of guards presently in use has shortcomings which have adverse affects upon the efficiency, effectiveness, and morale of the workers.

Guards utilizing electromagnetic fields include those using radio frequency fields with sensing circuitry as well as those using other portions of the electromagnetic spectrum utilizing photoelectric sensing devices. The adjustment of these devices is critical; the guard must be far enough from the tool that the machine can be stopped before the worker can be injured by the machine in the event that a portion of the worker's body passes through the field. If the guard is positioned less than this critical distance from the danger area, the cooperation of the worker must be obtained so that he will not place any part of his body in the danger area during the critical phase of the ram stroke when the guard will not stop the machine quickly enough to prevent injury; if an accident does occur, it is difficult to prove that it was due to the employee's negligence. The distance that the guard forces the worker to be away from the tool makes it impossible to use the guard for certain types of operations such as bending small pieces of metal on brake presses.

Pull-out devices are used on some power presses. These devices must be carefully adjusted with each die change; they tend to be designed for a particular application so that a single design is not universally applicable to all presses. Operators tend to find this type of device both uncomfortable and cumbersome; the situation of manacling the operator to the machine is psychologically unhealthy. Management must constantly enforce its use because of worker dissatisfaction with this type of guard.

Barrier guards are used with many power operated machines. These devices, by definition, provide a barrier only and are not interfaced with the control circuitry of the machine; if the guard is faulted by the operator, he can be injured. Barrier guards tend to either limit operations or slow down production. Many types of barrier guards require readjustment with each change in workpiece thickness. Usually, barrier guards are easy to remove; if the guard impedes operations too much, it will, in may cases, be removed.

Sweep guards are used on many power presses; they are always designed for a specific machine. They tend to limit the type of operations which can be performed on the machines which they guard since they do not allow the operator to work in the proximity of the tool. They slow down the production rate since the sweep operation must be completed prior to the press operation; this uses valuable production time.

Two hand trips are used to protect the operator on many power operated machines. These devices do not protect bystanders. They have a history of being faulted by workers who used tools that allowed them to hit both switches at one time with one hand while they held the workpiece with the other hand; this process increased their production rate. Besides slowing the production rate, two hand trips also limit operations by requiring a mechanical means of holding the workpiece while the operator hits the two hand trips.

Interlocking gate guards, as they are presently conceived, must close prior to the press beginning operations. They are normally located several inches from the tool, thus limiting the types of operations which can be performed on the machine. If this invention were to be placed into one of the six broad categories of guards, it would fit best into the category of interlocking gate guards; however, it differs from interlocking gate guards as they are presently conceived in several ways. First, it is ram mounted, thus allowing the operator to place any part of his body within less than an inch of the tool or ram with complete safety. Second, in one of the embodiments of the basic design, the guard is adjusted when it is installed so that the thickest workpiece used on the machine can pass freely through the gap formed by the bed of the machine and the safety gate; this eliminates the thickness adjustment that is required by many guards. It also allows the machine to function in an automatic mode without endangering the operator or bystanders. It does all this without adding an extra time consuming operation since the guard closes with the stroke of the ram.

The drawings and description hereinafter given describe the invention in general terms, as well as giving a specific application showing how the invention might be applied to a brake press. The first part of the description and FIG. 1 discuss the interfacing of the invention with the control circuitry of power operated machines.

The term "interfacing" refers to the devices which are connected between the guard and the machine which cause the machine either to stop or to stop and then immediately reverse to its initial position once a foreign object has been detected. It should be remembered throughout this section that parts of the control circuitry of this invention are an integral part of the safety gate which is mounted to the ram, or similar instrument, of the power operated machine. Thus, there is a great deal of flexiblility in sensing instruments because the gate touches the workpiece thus allowing the sensor to use the properties of the workpiece as a standard; if those properties are not measured by the sensor, then the sensor interprets that it has sensed a foreign object and appropriate action is taken. The next section of the description and FIGS. 2 through 6 discuss the operation of the invention. The last section of description and FIGS. 7 through 16 demonstrate some of the many methods of mounting the gate to the ram. The guard is shown as it might be applied to a brake press and uses the property of conductivity to detect the workpiece and foreign objects. The simplicity of this sensing system allows the basic concepts utilized by the invention to be demonstrated without adding any extra confusion which might be caused by a more complex sensing system. It should be understood that these illustrations of the use of this invention are given for the purpose of providing an example of an application only and not to provide a limitation to the application, embodiment or scope of this invention since it is applicable with equal facility and usefulness to other power operated machines utilizing rams, or similar instruments. Furthermore, the phraseology used herein is for the purpose of description and not limitation. With the preconditions as stated above understood, the invention is herein illustrated with reference to the drawings in which the corresponding numerals refer to the same parts.

FIG. 1 shows the control circuitry of the invention and the power operated machine. The phantom lines indicate a generalized circuit for a power operated machine utilizing a ram, or similar instrument; it is well known and does not constitute a part of this invention.

Power source 1 may be electrical, pneumatic, hydraulic, or mechanical and includes a means of changing one power type to another such that the type of power which is output to the machine 2 is the same type of power being controlled by the control circuitry 3 and being transmitted by means indicated generally as lines 4. Items 5 through 10 are items which constitute a part of this invention. The diagram shows the position of the circuitry when a foreign object is present; note that the guard circuitry causes the power transmission to be interruped in such a situation. On machines which contain devices which cause the motion of the ram to be stopped when power is not supplied, this is all that would be required to stop the ram. However, some machines would require an external brake for the ram; on others, it might be useful and desirable to reverse the ram so that it is repositioned at the top of its stroke. Control box 5 generally illustrates the means for stopping the motion of the ram which might be required on some machines; control box 6 generally indicates the means of repositioning the ram at the top of the stroke after the foreign object has been sensed and the downward motion of the ram stopped. It should be understood that control boxes 5 and 6 are not always required. A relay 7 is activated by the sensors in the safety gate. Its purpose is to interrupt the flow of power from the source to the machine, and, when required, reroute that power to the braking means 5 (FIG. 1) and the means 6 for repositioning.

Power is supplied to the guard circuitry from source 8; it may be the main power source for the machine, or an independent source such as an electrical wall socket or a battery pack. Sensing means 9 detects the workpiece and foreign objects and may either act as a switch or constitute means which activates a switch to open the circuit controlling the relay 7 when a foreign object is sensed. Sensing means 9 utilizes any property or combination of properties of the workpiece and foreign objects which would indicate an unsafe situation; examples of some properties which might be used to sense the workpiece and foreign objects are conductivity, permitivity, reluctivity, optical properties, and thermal and other material properties. Sensing device 10 is a means for sensing the position of the free floating safety gate. Device 10, which is in electrical parallel with sensing means 9, may be located in any position on the gate that would allow it to sense that the gate is moving up relative to the ram, and, it can be a limit switch, contact switch, magnetic proximity switch, or any other arrangement of switches and sensors which would indicate that the gate had begun moving up relative to the ram. The addition of sensing device 10 allows the safety gate to be initially positioned with a gap through which the thickest workpiece which is contemplated to be used on the machine could pass; thus, the guard requires only an initial adjustment as long as the basic configuration of the machine does not change. This gap also allows the machine to be operated in an automatic mode as shown in FIGS. 2 through 5.

FIG. 2 and 3 demonstrate the response of the machine when a foreign object is sensed by the guard; FIGS. 4 through 6 illustrate normal operation. In FIG. 2 the pedal (not shown) operating the press is closed and the ram 11 starts to descend. It can descend because switch 10 is closed. Switch 10 is composed of the two terminals 23 and 25. The safety gate 12 descends with the ram. The safety gate 12 is illustrated in front elevation in FIG. 9. FIG. 3 shows that the safety gate has contacted a foreign object, the operator's hand, which is thicker than the workpiece. Two things now happen simultaneously. First, switch 10, a contact switch in this example, is open since the safety gate hit an object which causes the whole gate to move slightly upward, separating contacts 23 and 25 and thus opening the switch. Additionally, switch 9, having one terminal formed by a strip of electrically conductive material 27 at the bottom of the gate and the other terminal constituting the base 16 of the machine, senses the object. Since the operator's hand is not conductive enough to allow sufficient current to keep the relay closed, the relay opens and the ram's motion is stopped.

FIGS. 4 through 6 illustrate the operation if the operator moves his hand prior to the safety gate touching it. FIG. 4 shows that the ram 11 has moved down to a point that the strip of aluminum 27 has touched the metal workpiece. The contact switch 10 is open; however, in this case, the sensing switch 9 is closed because the workpiece 14 conducts the electricity between contact 27 and base 16. Thus the relay remains closed. The ram 11 continues to move down while the safety remains stationary; relative to the datum line established by the ram, the safety gate moves upward from the point that the workpiece is touched by strip 27. At the point that the ram 11 touches the workpiece 14, the safety gate 12 begins to move upwardly in relation to the datum point since the workpiece which is being bent moves up; this is shown in FIG. 5. FIG. 6 shows that the stroke is complete. As the ram begins to move upward, the safety gate begins to move downward, always in contact with the workpiece 14. At the time contact is lost between gate 12 and the workpiece, the contact switch 10 is closed; thus the ram continues to move to its up position. The use of switch 10 allows the operator to operate the machine in a fully automatic mode in total safety with the by-product of an increased rate of production.

Some applications exist for which this fully automatic operation is not desirable; in those cases, switch 10 is deleted and the gate 12 is made to be free floating in both directions so that it always touches the stationary guard, the workpiece or a foreign object. In this application, the operator must lift the gate to insert the workpiece and the operation is the same as shown in FIGS. 4 through 6 with the exception that the safety gate remains touching the workpiece.

It should be noted that the safety gate may be made using a variety of materials just as long as the material does not interfere with the particular sensing system which is used; however, it is desirable that the material be transparent. For the system described above, a good material to use is polycarbonate plastic. It is transparent, can be bent to shapes easily, is lightweight and durable, and is non-conductive. With this material and configuration, it is possible to mount the gate so that the operator is within 1/16 inch of the tool. At this distance, this invention does not form an obstacle to performing delicate operations as other guards do. The ability of this invention to be placed so close to the tool is due to its being mounted to the ram, or similar instrument, of the power machine. There are several methods, three such being described below which are typical methods of attaching the safety gate to the ram of a brake press; other similar methods could be devised by those skilled in the art. The discussion is representative of the three different positions at which the safety gate may be attached to the ram: placed at the vertical edges of the safety gate (end guides), set in slots which are made in the safety gate (slotted guides), and placed at the horizontal edges of the safety gate (horizontal edge guides). The guides provide a smooth surface for the safety gate to slide against. They may be made of any suitable material which will not interfere with the sensing system being used by the invention. For example, if the sensing system utilized the property of conductivity, a plastic such as polytetraflourine or nylon would make an excellent choice for a material for the guides since they are both non-conducting, are easily machined, and have good lubricity. The guides may be attached to the ram using a variety of connecting means, such as, for example bolts, screws, and epoxy cements.

Figure 8:
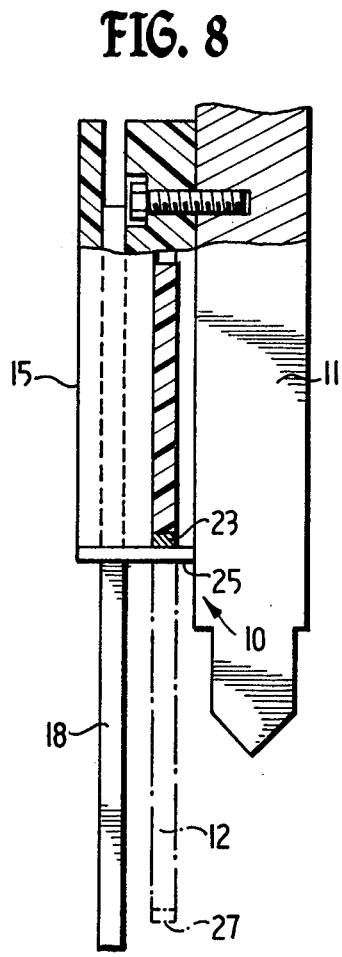
FIG. 8 is a detailed partial cross-sectional view of the guide used in FIG. 7.
Figure 9:
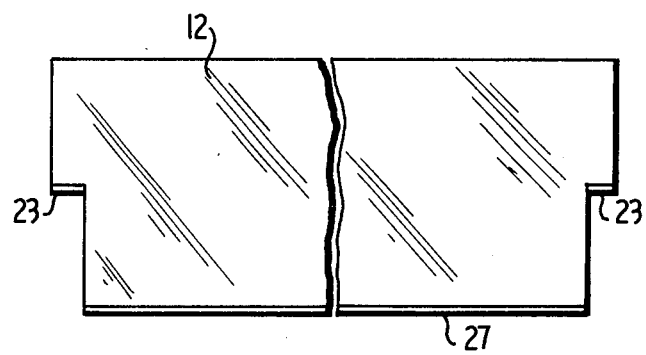
FIG. 9 is an elevational view of the gate used in the invention as shown in FIGS. 2-9.
Figure 10:
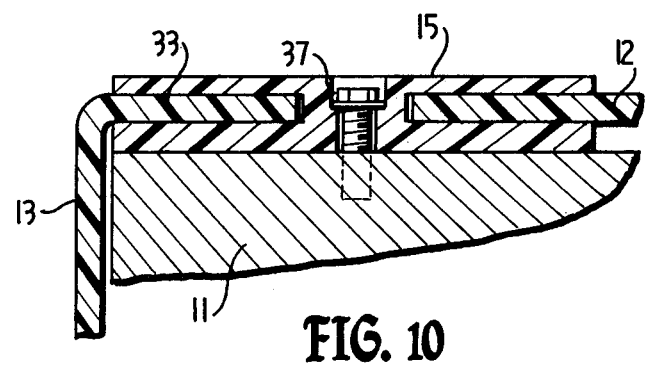
FIG. 10 is a sectional view taken along the lines 10—10 of FIG. 7.
Figure 11:
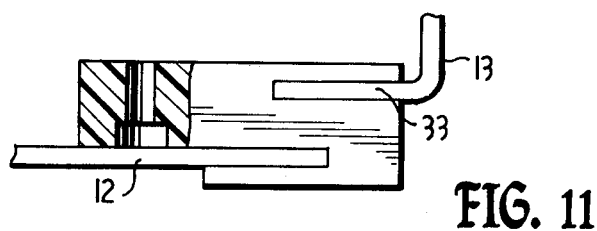
FIGS. 11, 12 & 16 are plan views of alternative guides which may be used in the invention.
Figure 12:
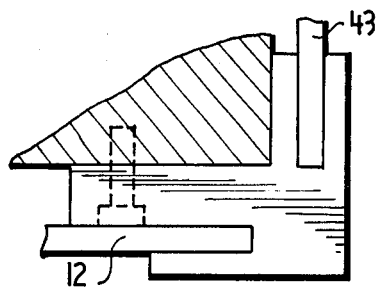

FIGS. 7 through 12 show the use of end guides 15. Also shown in FIG. 7 is a fixed safety guard 13 which includes a right angle section 33 which fits into guide 15. FIG. 7 demonstrates one way which end guides might be used on a brake press. Guide 15 is shown in FIG. 10 with the gate 12 in one slot and the fixed shield 13 shown in the other slot. Bolt hole 37 is provided for attachment of the guide to the ram. FIG. 8 shows a detailed cross section of the end guide used in FIG. 7 and demonstrates a typical configuration. Note that the switch 10 is shown in a position that allows it to be a simple contact switch. The upper contact of switch 9 is shown on the safety gate 12. It is important to note that if this particular configuration is used, the safety gate must have the bottom corners cut out; this is shown in FIG. 9. The length of this cut out will be dependent upon the desired height of the gap between the bottom edge of the safety gate and the base of the press. FIGS. 11 and 12 show the top views of a modified guide. FIG. 12 illustrates a further guide which may be used with a fixed shield 43 not having a right angle section. These examples are provided as a graphic example of the many configurations which can be used for end guides; this invention includes all such possible configurations.

Figure 14:
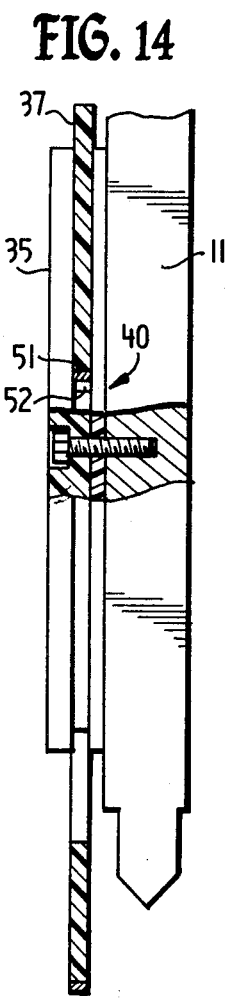
FIG. 14 is a detailed partial view of the mounting means of FIG. 13.
Figure 13:
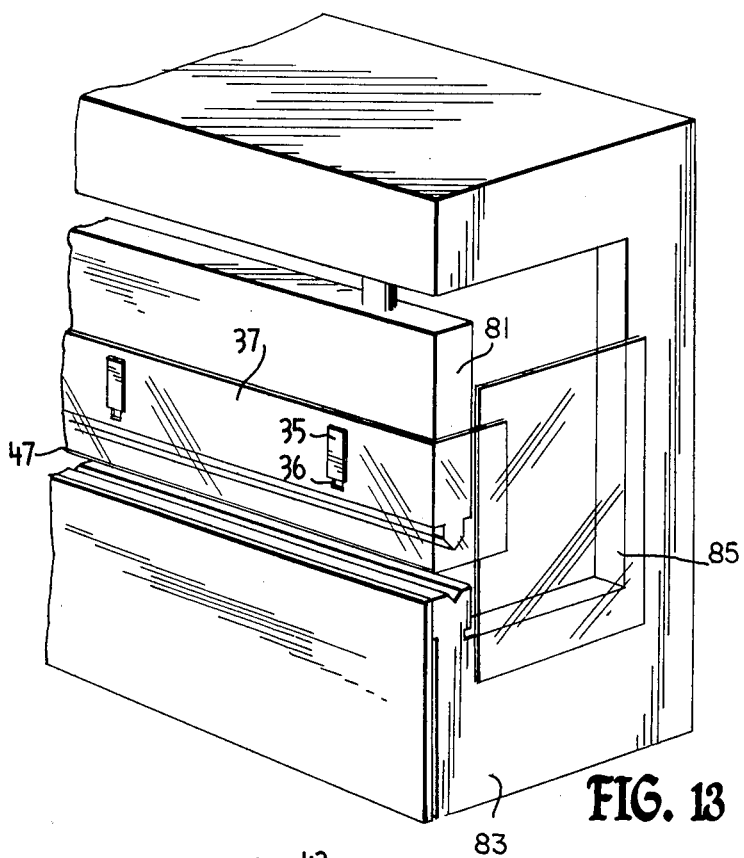
FIG. 13 is a perspective view of an alternate means for mounting the gates of the present invention.
Figure 15:
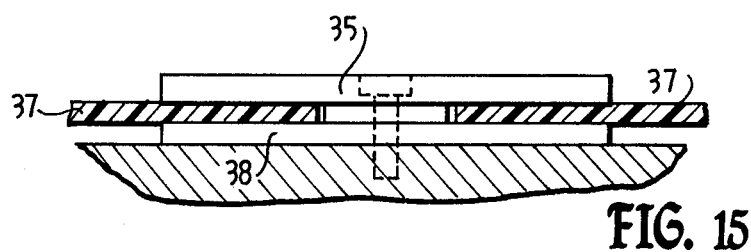
FIG. 15 is a plan view of the guide means used with FIG. 14 and FIG. 15.

FIGS. 13 through 15 show the use of slotted guide 35. Slotted guide 35 is mounted on ram 81 which moves relative to fixed bed 83. Also shown as a side guard 85. This is an example of the use of one type of slotted guide as it might be used on an upmoving bed brake press. In this instance, the modified gate 37, FIG. 15, includes slots 36 within which the control portion 38 of guides 35 fit FIG. 14 shows a detailed cross section of the type of slotted guide shown in FIG. 13. FIG. 14 shows a positioning of the switch 40 which allows it to be a simple contact switch including contacts 51 and 52. The upper contact of switch 9 is shown at the bottom of the safety gate. The height of the desired gap between contact 47 of the safety gate and the base of the press is dependent upon the positioning and length of the slots 36 in the safety gate and the positioning of the slotted guides 35.

Figure 16:
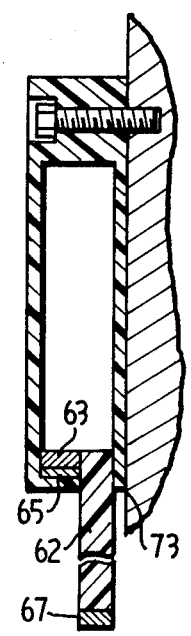

FIG. 16 shows the use of a gate 62 having an upper lip which constitutes contact 63 and a lower edge which constitutes contact 67. The guide is a hollow rectangle with a lower opening 73 which allows vertical movement of gate 62. A lip in the guide 71 is used to mount contact 65. Contacts 63 and 65 represent switch 10 of FIG. 1 while contact 69 is one of the contacts of switch 9 of FIG. 1.

It should be noted that the invention may include a guard 13 which is used for those areas where it is not critical to the operations to have a guard such as the safety gate, which can be moved, and where bystanders could place portions of their bodies into a danger area. This stationary guard 13 is shown in FIGS. 7 and 13.

From the above description, it is obvious that this invention provides an effective means of protecting personnel from injury caused by the ram of the brake press. It should be understood that the above described arrangements of the invention were meant to be illustrative of the principles embodied in the invention; many other arrangements could be devised by persons skilled in the art which would embody the principles of this invention and meet the specific requirements of particular machines. Therefore, reference should be made to the following claims rather than to the specific descriptions herein to indicate the scope of this invention.

I claim:

1. A safety guard for a power operated machine, which machine utilizes a reciprocating part, including a working tool, located above a fixed bed for supporting a workpiece, comprising;

a safety gate mounted to the reciprocating part by a connecting means and made to be free floating in at least one direction, said gate being spaced from said reciprocating part and movable in a path parallel to said working tool;

a first sensing means actuated by movement of said safety gate to sense the presence of a foreign object;

an interfacing means to interface said first sensing means with said power operated machine so the intitial motion of the reciprocating part will be stopped when the foreign object is sensed;

a second electrically conductive sensing means secured to said safety gate to sense the presence of a conductive workpiece; and means for connecting said second conductive sensing means to said power operated machine through said conductive workpiece and said interfacing means for continuing the initial motion of said reciprocating part while said second sensing means is in contact with said workpiece.

2. The safety guard of claim 1 further comprising:

a stationary guard which shields those danger areas of the said power operated machine not shielded by the safety gate affixed by a connecting means to the stationary portion of the said power operated machine.

3. The safety guard of claim 1 comprising:

a reversing means which is interfaced with said interfacing means so that the direction of motion of the reciprocating part is made to be the reverse of the initial motion and such that when the reciprocating part reaches its initial position the said reciprocating part is caused to stop.

4. The safety guard of claim 1 wherein said interfacing means is a relay.

5. The safety guard of claim 4 wherein said relay activates a braking mechanism which stops the initial motion of said reciprocating part.

6. The safety guard of claim 1 wherein said first sensing means is a contact switch.

7. The safety guard of claim 1 wherein said first sensing means is a limit switch.

8. The safety guard of claim 1 wherein said first sensing means is a magnetic proximity switch.

9. The safety guard of claim 1 wherein said first sensing means utilizes the property of permittivity.

10. The safety guard of claim 1 wherein said first sensing means utilizes the property of reluctance.

11. The safety guard of claim 1 wherein the means for mounting the safety gate to said reciprocating part is end guides.

12. The safety guard of claim 1 wherein the means for mounting the safety gate to said reciprocating part is slotted guides.

13. The safety guard of claim 1 wherein the reciprocating part is located below the fixed bed and said safety gate is mounted to the fixed part.

14. The safety guard of claim 1 wherein the axis of motion of said reciprocating part may be in any direction with respect to the ground.

15. The safety guard of claim 1 wherein the means for mounting the safety gate to said reciprocating means is a horizontal edge guide.

16. The safety guard of claim 15 wherein the axis of motion of said reciprocating part may be in any direction with respect to the ground.

* * * * *